(12) United States Patent
Jackel

(10) Patent No.: US 8,655,176 B2
(45) Date of Patent: Feb. 18, 2014

(54) SYSTEM AND METHODS FOR CONVERTING A TEMPORALLY SHORT AND SPECTRALLY BROAD OPTICAL PULSE INTO A TRAIN OF SPECTRALLY NARROW OPTICAL PULSES

(75) Inventor: Janet Jackel, Holmdel, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 850 days.

(21) Appl. No.: 12/694,791

(22) Filed: Jan. 27, 2010

(65) Prior Publication Data
US 2011/0182587 A1 Jul. 28, 2011

(51) Int. Cl.
*H04J 14/02* (2006.01)

(52) U.S. Cl.
USPC ........... 398/79; 398/183; 398/189; 398/194; 398/200; 398/201; 398/82; 398/91; 385/24; 385/37; 341/137; 341/111

(58) Field of Classification Search
USPC ........... 398/182, 183, 79, 200, 92, 201, 158, 398/159, 186, 188, 189, 192, 193, 194, 82, 398/91; 385/24, 37, 40; 341/137, 111
See application file for complete search history.

(56) References Cited

U.S. PATENT DOCUMENTS

| | | | |
|---|---|---|---|
| 6,100,831 A * | 8/2000 | Frankel | 341/137 |
| 6,690,855 B2 * | 2/2004 | Thompson et al. | 385/27 |
| 7,359,638 B2 * | 4/2008 | Kim et al. | 398/92 |
| 2002/0071155 A1 * | 6/2002 | Inada et al. | 359/124 |
| 2002/0191904 A1 * | 12/2002 | Kani et al. | 385/24 |
| 2005/0111848 A1 * | 5/2005 | Grubb et al. | 398/147 |
| 2006/0024066 A1 * | 2/2006 | Fujiwara et al. | 398/183 |

OTHER PUBLICATIONS

Clark, T., et al., "Performance of a Time- and Wavelength-Interleaved Photonic Sampler for Analog-Digital Conversion" IEEE Photonics Technology Letters, Sep. 1999, vol. 11, No. 9.
Mortimore, D. "Fiber Loop Reflectors" Journal of Lightwave Technology, Jul. 1988, vol. 6, No. 7.
Ikuma, Y., et al., "Integrated loop mirrors for catoptric functional waveguide devices" IEICE Electronics Express, Mar. 10, 2008, vol. 5, No. 5, pp. 176-180.
Delfyett, P., et al., "Signal Processing at the Speed of Lightwaves" IEEE Circuits & Devices Magazine, Sep. 2002, pp. 28-35.

* cited by examiner

*Primary Examiner* — Hanh Phan
(74) *Attorney, Agent, or Firm* — Philip J. Feig

(57) ABSTRACT

A system and methods are provided for converting a first temporally short and spectrally broad optical pulse into a train of spectrally narrow and distinct optical pulses. This involves receiving, on a first I/O channel, the first optical pulse associated with a plurality of wavelengths and performing wavelength division demultiplexing on the first optical pulse at an optical unit housed on an optical chip to output a plurality of second optical pulses on different ones of a plurality of second I/O channels, each of the second optical pulses associated with a unique wavelength range from the first optical pulse. This also involves receiving the second optical pulses at loop mirrors in the second I/O channels, wherein the second I/O channels are patterned as waveguides in the optical chip and reflecting, at the loop mirrors, the second optical pulses back to the optical unit.

14 Claims, 3 Drawing Sheets

SYSTEM AND METHODS FOR CONVERTING A TEMPORALLY SHORT AND SPECTRALLY BROAD OPTICAL PULSE INTO A TRAIN OF SPECTRALLY NARROW OPTICAL PULSES

BACKGROUND

1. Technical Field

This invention generally relates to optical data processing. In particular, this invention relates to a system and method for converting a temporally short and spectrally broad optical pulse into a train of spectrally narrow and distinct optical pulses.

2. Description of the Related Art

Analog signals are often digitized using an analog-to-digital converter (ADC). Digital signal processing may be performed on the digitized signal. The digital signal processing may require the digitized signal to have been sampled at a high rate and at a high resolution. High resolution means that, for example, many different voltage levels of the analog signal can be distinguished and digitally represented. Conventional electronic ADC may not be able to achieve both high sampling rates and a high resolution. To solve these problems, optical ADCs may instead be used.

The optical ADC may be based on converting a temporally short and spectrally wide optical pulse into a train of spectrally narrow and distinct optical pulses. The temporally short and spectrally wide optical pulse may itself be a part of a sequence of temporally short and spectrally wide optical pulses produced by a laser.

Accordingly, each individual short optical pulse produced by the laser may be transformed into a train of spectrally distinct pulses. The duration of the pulse train may be substantially the same as the time between the start of the individual short optical pulse in the sequence of short optical pulses that was transformed, and the start of a next individual short optical pulse in the sequence of short optical pulses that is to be transformed next.

As an illustrative example, a single optical pulse produced by the laser that is white, (i.e., including many wavelengths) may be transformed into a train of colored pulses (i.e., including a specific wavelength), e.g., red, blue, green, and purple. Each of the colored pulses is modulated with a different time portion of the analog data. Thus, the red pulse may carry a first time portion of the analog data, the blue pulse may carry a second time portion of the analog data, the green pulse may carry a third time portion of the analog data, and the purple pulse may carry a fourth time portion of the analog data. A wavelength demultiplexer may be used to separate the different colored pulses from the train, directing each to a detector and then to a corresponding ADC. Each ADC receives an optical pulse of a particular wavelength (e.g. color). For example, an ADC may process only red pulses. This "red ADC" does not need to convert the blue, green, or purple pulses. Accordingly, the red ADC can operate relatively slowly, and can be a low-bandwidth ADC.

For example, the red ADC may receive a red pulse carrying the first time portion of the analog signal. Next a blue ADC may receive the blue pulse carrying the second time portion. A green ADC may next receive the green pulse, and a purple ADC may next receive the purple pulse. After the purple pulse, another red pulse is received that carries, for example, a fifth time portion of the analog signal. The red ADC needs to process the initial red pulse before it receives another red pulse. Thus, because the red ADC only needs to process the red pulses, which are separated in time by blue, green and purple pulses, the red ADC does not need to operate as fast, even though a high sampling rate may be required. The same applies for the remaining ADCs. Thus, low-bandwidth (i.e., slower) ADCs may be used.

A property of these low-bandwidth ADCs is that they may have a higher resolution than a high bandwidth ADC. This means that a low bandwidth ADC can distinguish among a larger number of amplitude values that a higher bandwidth ADC when converting an analog signal to a digital signal, which solves a shortcoming of conventional electronic ADCs.

As described above, low-bandwidth ADCs may be used instead of high-bandwidth ADCs to increase the available resolution. But in some cases, the bandwidth of an analog signal is so high, that even conventional high-bandwidth ADCs cannot process the analog signal. In this scenario, using multiple ADCs receiving pulses of different wavelengths allow for ADC conversion on these high-bandwidth analog signals, which may not have previously been possible.

FIG. 1 discloses a prior art solution for transforming a white short optical pulse into a multi-colored pulse train for data modulation. FIG. 1 shows a system 100 that includes a mode locked fiber laser (MLFL) 102 outputting a short optical pulse with many wavelengths. Laser 102 sets the polarization of the short optical pulse in a given direction. The short optical pulse travels to polarization beam splitter (PBS) 104. PBS 104 can selectively send an optical pulse in one of two directions, depending on the polarization of the optical pulse. Here, PBS 104 sends the short optical pulse to channel 105 of wavelength division multiplexer (WDM) 106 based on the polarization of the optical pulse set by laser 102. WDM 106 demultiplexes the short optical pulse according to wavelength and outputs a plurality of optical pulses, each associated with a different span of wavelengths (i.e., of a particular color).

The plurality of optical pulses outputted by WDM 106 are combined into a pulse train by passing them back through WDM 106. This is done by connecting each output of WDM 106 to an optical fiber of different length. For example, assume that WDM 106 outputs a red pulse onto channel 108. Channel 108 is attached to a piece of optical fiber that is stretched by fiber stretcher (FS) 110 and delayed by delay loop (DL) 112. The red pulse takes an amount of time to pass through FS 110 and DL 112, and reaches Faraday mirror (FM) 114, attached to the end of the optical fiber. FM 114 flips the polarization of the red pulse and in such a manner that the return path compensates for any polarization distortions in the red pulse caused by travelling through the optical fiber. FM 114 also reflects the red pulse back towards WDM 106.

In addition to channel 108, the other outputs of the WDM are also connected to pieces of optical fiber. Each optical fiber also has a fiber stretcher, a delay loop, and a Faraday mirror. The optical fibers of the different outputs each have delay loops of different lengths, so that the pulses on each of the optical fibers are reflected back to WDM 106 at different times.

WDM 106 thus receives colored reflected pulses in a sequential order. WDM 106 multiplexes these colored reflected pulses into a pulse train. Each pulse in the pulse train has a color (i.e., a wavelength or wavelength range). In this way, a short white optical pulse can be transformed into a pulse train of colored pulses.

The pulse train outputs WDM 106 at channel 105 and reaches PBS 104. Because of the polarization flipping performed by the Faraday mirrors (such as FM 114), the pulse train reaches PBS 104 with a polarization that is opposite to the polarization of the short optical pulse that exited laser 102. Thus, PBS 104 sends the optical pulse train, in a different direction, to erbium doped fiber amplifier 116. Amplifier 116 sends the optical pulse train to modulation system 118, which modulates the optical pulse train with analog data.

A drawback to the prior art system shown in FIG. 1 is that optical fibers are necessary to reflect the colored pulses outputted by WDM 106 back to WDM 106 for multiplexing into the optical pulse train. The additional optical fibers (associated with the fiber stretchers, delay loops, and Faraday mirrors) cause system 100 to be too large. It would be preferable to decrease the size of system 100. In addition, because it is difficult to control the length of the fiber to required degree of accuracy, fiber stretchers are required for additional control, and in some cases, the desired delay accuracy cannot be achieved. In addition, the optical interface between the fiber and the WDM increases optical loss.

SUMMARY

In accordance with the invention, there is further provided a method of converting a first temporally short and spectrally broad optical pulse into a train of spectrally narrow and distinct optical pulses the method comprising the steps of: receiving, on a first input/output (I/O) channel, the first optical pulse associated with a plurality of wavelengths; performing wavelength division demultiplexing on the first optical pulse at an optical unit housed on an optical chip to output a plurality of second optical pulses on different ones of a plurality of second I/O channels, each of the second optical pulses associated with a unique wavelength range from the first optical pulse; receiving the second optical pulses at loop mirrors in the second I/O channels, wherein the second I/O channels are patterned as waveguides in the optical chip; reflecting, at the loop mirrors, the second optical pulses back to the optical unit; multiplexing, at the optical unit, the reflected second optical pulses into the train of spectrally narrow and distinct optical pulses, wherein each pulse in the optical pulse train is associated with a unique wavelength range from the wavelengths of the first optical pulse; outputting the optical pulse train on the first I/O channel; receiving the optical pulse train at an optical circulator coupled to the first I/O channel; and separating, by the optical circulator, the optical pulse train outputted on the first I/O channel from an optical signal inputted on the first I/O channel.

In accordance with this invention, there is further provided a system for converting a first temporally short and spectrally broad optical pulse into a train of spectrally narrow and distinct optical pulses the system comprising: a first I/O channel configured to receive the first optical pulse associated with a plurality of wavelengths; an optical unit housed on an optical chip, the optical unit configured to perform wavelength division demultiplexing on the first optical pulse; a plurality of second I/O channels on the optical chip and coupled to the optical unit, each configured to output different ones of a plurality of second optical pulses, each of the second optical pulses associated with a unique wavelength range from the first optical pulse; loop mirrors in patterned waveguides of the second I/O channels, the loop mirrors configured to receive the second optical pulses and to reflect the second optical pulses back to the optical unit; wherein the optical unit is further configured to multiplex the reflected second optical pulses into the train of spectrally narrow and distinct optical pulses, wherein each pulse in the optical pulse train is associated with a unique wavelength range from wavelengths of the first optical pulse, wherein the first I/O channel is further configured to output the optical pulse train; and an optical circulator coupled to the first I/O channel, the optical circulator configured to receive the optical pulse train and to separate the optical pulse train outputted on the first I/O channel from an optical signal inputted on the first I/O channel.

It is important to understand that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented here. While the techniques and embodiments will primarily be described in the context of the accompanying drawings, those skilled in the art will further appreciate that the techniques and embodiments can also be practiced in other optical devices or systems.

Reference will now be made in detail to exemplary embodiments of the present invention, examples of which are illustrated in the accompanying drawings. Whenever possible, the same reference numbers will be used throughout the drawings to refer to the same or like parts.

References are made to optical pulses being associated with a wavelength. The wavelength may not necessarily be a specific wavelength. The wavelength may be within a wavelength range. The wavelength may be an average wavelength.

Figure 2:
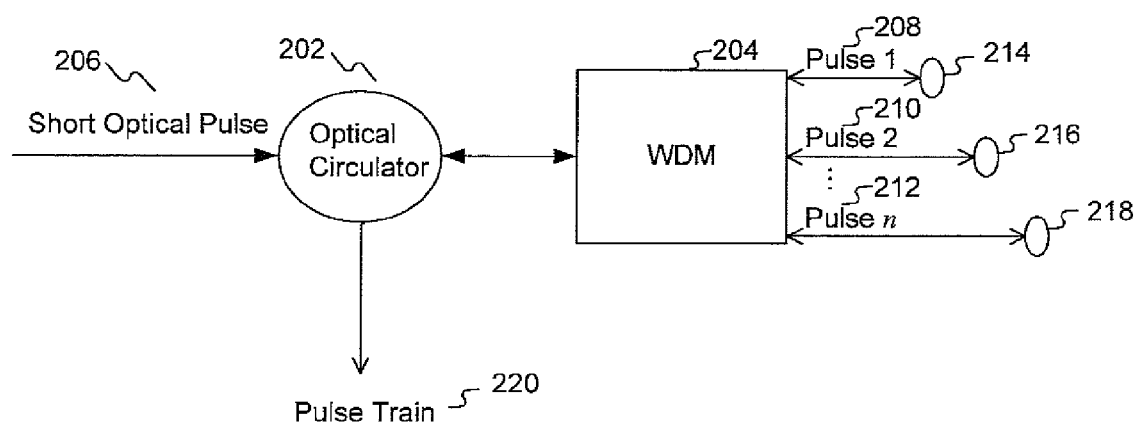
FIG. 2 illustrates an exemplary system for transforming a short white optical pulse (i.e., of multiple wavelengths) into an optical pulse train of different colors (i.e., different wavelengths or wavelength ranges).

FIG. 2 illustrates a system 200 for transforming a short white optical pulse (i.e., of multiple wavelengths) into an optical pulse train of different colors (i.e., different wavelengths or wavelength ranges). System 200 does not include optical fibers. Indeed, system 200 may be housed on a single optical chip.

Figure 1:
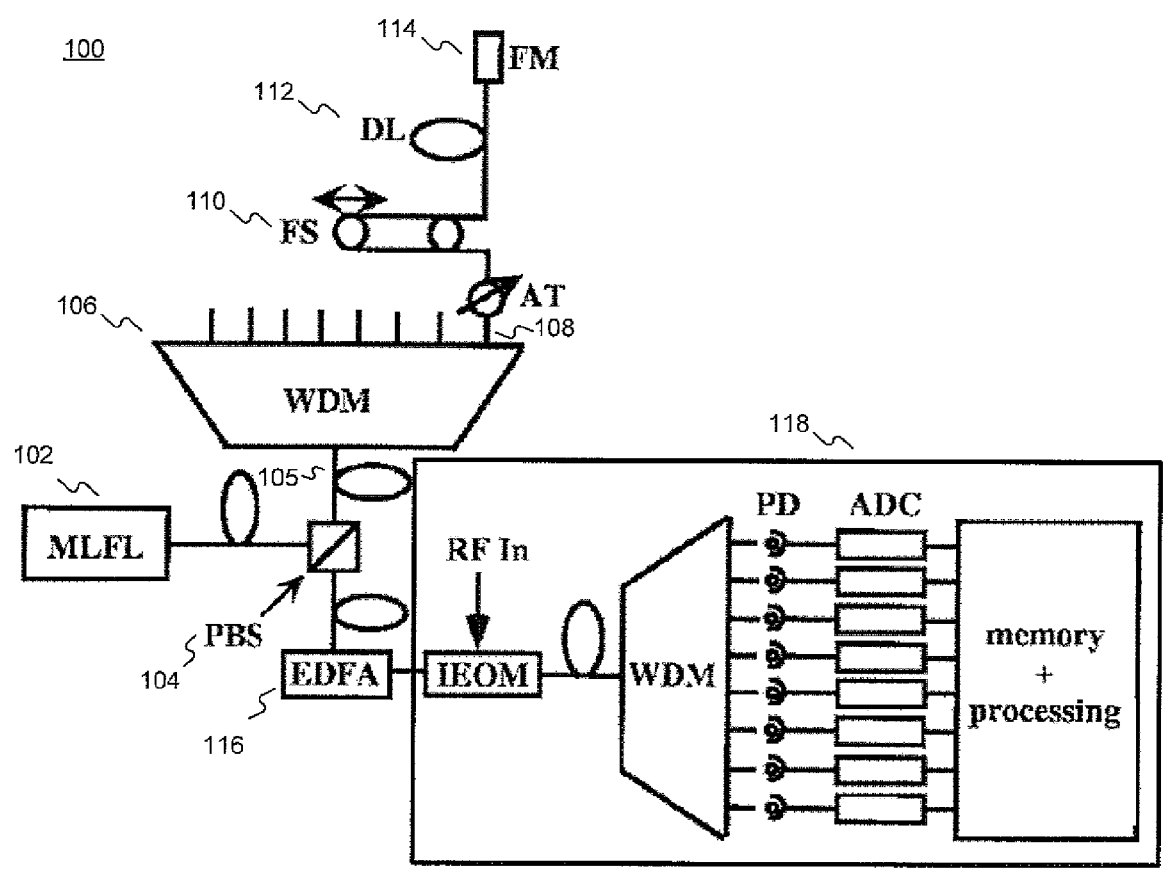
FIG. 1 discloses a prior art solution for transforming a white short optical pulse into a multi-colored pulse train for data modulation.

System 200 includes optical circulator 202 and wavelength division multiplexer (WDM) 204. Optical circulator 202 performs a similar function to PBS 104 in FIG. 1. In particular, optical circulator 202 can selectively send an optical pulse in different directions.

Optical circulator 202 receives short optical pulse 206. Short optical pulse 206 may be created by a mode locked laser (not shown) and may include many wavelengths that can be used to carry or be modulated by data. Short optical pulse 206 may also be a white pulse. Optical circulator 202 may direct short optical pulse 206 to WDM 204. WDM 204 may be an arrayed waveguide grating (AWG).

WDM 204 may receive short optical pulse 206 associated with a plurality of wavelengths. WDM 204 may perform wavelength division demultiplexing on short optical pulse 206 and output pulse 1 208, pulse 2 210, and pulse n 212. Each of pulse 1 208, pulse 2 210, and pulse n 212 may be associated with a unique one of the wavelengths from short optical pulse 206. In disclosed embodiments, the unique wavelength may actually be a unique range of wavelengths. Therefore, each of pulse 1 208, pulse 2 210, and pulse n 212 may be a different color. WDM 204 may output each of pulse 1 208, pulse 2 210, and pulse n 212 on a different waveguide patterned on the optical chip.

Each of the waveguides may also include loop mirrors, for example, loop mirrors 214, 216, and 218. Loop mirrors 214, 216, and 218 may be patterned as part of the waveguides, and therefore can be manufactured as part of the optical chip. Loop mirrors 214, 216, and 218 may be located at staggered distances from WDM 204. For example, loop mirror 214 may be closer to WDM 204 than loop mirror 216, which is closer than loop mirror 218.

Therefore, pulse 1 208 may reach loop mirror 214 at a first time, pulse 2 210 may reach loop mirror 216 at a second time later than the first time, and pulse n 218 may reach loop mirror 218 at a third time later than both the first time and the second time. Loop mirrors 214, 216, and 218 reflect pulse 1 208, pulse 2 210, and pulse n 212, respectively, back to WDM 204.

Accordingly, WDM 204 receives, in time order, reflected pulse 1 208, reflected pulse 2 210, and reflected pulse n 212. WDM 204 multiplexes reflected pulse 1 208, reflected pulse 2 210, and reflected pulse n 212 into optical pulse train 220. Each pulse in optical pulse train 220 is associated with a unique one of the wavelengths from short optical pulse 206, and therefore may each be of a different color. In disclosed embodiments, the unique wavelength may actually be a unique range of wavelengths. In particular, a first pulse of pulse train 220 may have the same wavelength or wavelength range as pulse 1 208, while a second pulse of pulse train 220 may have the same wavelength or wavelength range as pulse 2 210. Similarly, a later pulse of pulse train 220 may have the same wavelength or wavelength range as pulse n 212.

Short optical pulse 206 may span a shorter period of time than pulse train 220. System 200 effectively separates and time-delays the wavelengths of short optical pulse 206, into pulse train 220. In pulse train 220, different wavelengths are associated with different pulses, and different pulses are associated with different times.

WDM 204 directs pulse train 220 to optical circulator 202, which outputs pulse train 220 to a modulation system. Thus, optical circulator 202 may separate optical pulse train 220 outputted by WDM 204 from short optical pulse 206 inputted to WDM 204.

Figure 3:
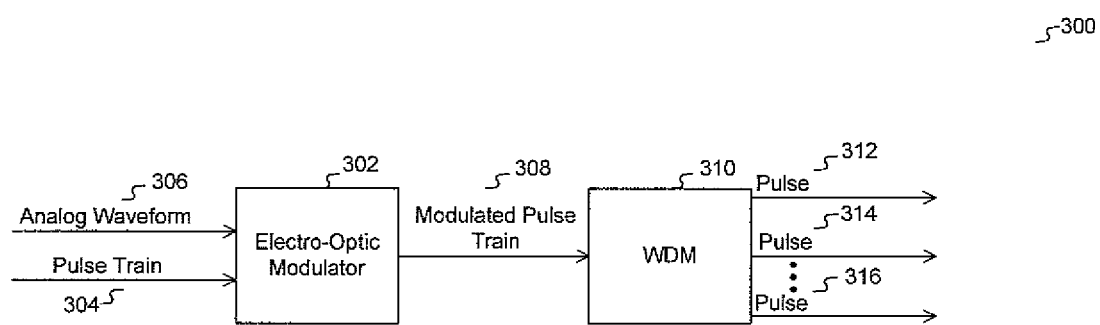
FIG. 3 illustrates a modulation system for modulating a train of spectrally narrow and distinct optical pulses

FIG. 3 illustrates a modulation system 300 for modulating a train of spectrally narrow and distinct optical pulses. System 300 includes electro-optic modulator 302. Electro-optic modulator 302 receives pulse train 304, which may be similar to pulse train 220 in FIG. 2, and also receives analog waveform 306. Analog waveform 306 may be a signal measured over time.

Electro-optic modulator 302 may modulate each of the optical pulses in pulse train 220 with a different time portion of analog data from analog waveform 306. For example, electro-optic modulator 302 may modulate an initial pulse of pulse train 220 with an initial time portion of analog waveform 306. Electro-optic modulator 302 may also modulate a subsequent pulse of pulse train 220 with a subsequent time portion of analog waveform 306. Electro-optic modulator 302 may output a modulated pulse train 308 to WDM 310. Each pulse in modulated pulse train 308 may be modulated with a different time portion of analog waveform 306.

WDM 310 may demultiplex modulated signal 308 into modulated optical pulses 312, 314, and 316, each with a different wavelength or wavelength range. Pulse 1 312 may correspond to a demultiplexed first modulated pulse of modulated pulse train 308, pulse 2 314 may correspond to a demultiplexed second pulse of modulated pulse train 308, and pulse n 316 may correspond to a demultiplexed later pulse of modulated pulse train 308. Moreover, pulse 1 312 may modulate an initial time portion of analog waveform 306, 2 pulse 314 may modulate a subsequent time portion of analog waveform 306, and pulse n 316 may modulate a further subsequent time portion of analog waveform 306. In this way, each of pulses 312, 314, and 316 samples a different time portion of analog waveform 306.

A loop mirror may be used instead of a cleaved or polished facet on the end of an optical chip or optical fiber. In disclosed embodiments, the loop mirror may be constructed as a loop in a waveguide. For example, the waveguide may be connected to a 1×2 coupler that has its outputs connected as a loop. A pulse travelling on the waveguide may be split into two light beams by the 1×2 coupler. Each light beam may travel in a different direction around the loop and be recombined as a pulse by the 1×2 coupler. The recombined pulse may loop back in the other direction, and thus be "reflected." In this way, the loop may function as a mirror. Because the loop mirror may be constructed in a waveguide, it may be placed on an interior portion of the optical chip, and not only at the edge of the optical chip. Moreover, the loop mirror may be included as part of the patterning of optical chip waveguides. In order to be compact, the loop mirror may require a very high index contrast between the waveguide and the surrounding material.

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method of converting a first temporally short and spectrally broad optical pulse into a train of spectrally narrow and distinct optical pulses, the method comprising the steps of:

receiving, on a first input/output (I/O) channel, the first temporally short and spectrally broad optical pulse associated with a plurality of wavelengths;

performing wavelength division demultiplexing on the first temporally short and spectrally broad optical pulse at an optical unit housed on an optical chip to output a plurality of second optical pulses on different ones of a plurality of second I/O channels, each of the second optical pulses associated with a unique wavelength range from the first temporally short and spectrally broad optical pulse;

receiving the second optical pulses at loop mirrors in the second I/O channels, wherein the second I/O channels are patterned as waveguides in the optical chip;

reflecting, at the loop mirrors, the second optical pulses back to the optical unit;

multiplexing, at the optical unit, the reflected second optical pulses into the train of spectrally narrow and distinct optical pulses, wherein each pulse in the optical pulse train is associated with a unique wavelength range from the wavelengths of the first temporally short and spectrally broad optical pulse;

outputting the optical pulse train on the first I/O channel;

receiving the optical pulse train at an optical circulator coupled to the first I/O channel; and separating, by the optical circulator, the optical pulse train outputted on the first I/O channel from an optical signal inputted on the first I/O channel.

2. The method of claim 1, wherein the step of receiving the second optical pulses further comprises the step of:

receiving the second optical pulses at the loop mirrors, which are located at staggered distances from the optical unit.

3. The method of claim 2, wherein the step of receiving the second optical pulses further comprises the steps of:

receiving, at a first loop mirror, a first of the second optical pulses at a first time; and receiving, at a second loop minor, a second of the second optical pulses at a second time later than the first time, the second loop mirror located farther from the optical unit than the first loop mirror.

4. The method of claim 3, wherein the step of multiplexing the reflected second optical pulses further comprises the steps of:

receiving, at the optical unit, the first of the second optical pulses before receiving the second of the second optical pulses; and multiplexing at least the first of the second optical pulses with the second of the second optical pulses into the optical pulse train, wherein an initial pulse of the optical pulse train has the same wavelength as the first of the second optical pulses and a subsequent pulse of the optical pulse train has the same wavelength as the second of the second optical pulses.

5. The method of claim 1, wherein the optical unit is an arrayed waveguide grating (AWG).

6. The method of claim 1, further comprising the steps of:

modulating an initial pulse of the optical pulse train with an initial time portion of an analog waveform;

modulating a subsequent pulse of the optical pulse train with a subsequent time portion of the analog waveform; and demultiplexing the modulated optical pulse train into a third plurality of optical pulses of different wavelengths, a first of the third optical pulses modulating the initial time portion of the analog waveform and a second of the third optical pulses modulating the subsequent time portion of the analog waveform.

7. The method of claim 1, wherein the first temporally short and spectrally broad optical pulse spans a shorter period of time than the optical pulse train.

8. A system for converting a first temporally short and spectrally broad optical pulse into a train of spectrally narrow and distinct optical pulses, the system comprising:

a first I/O channel configured to receive the first temporally short and spectrally broad optical pulse associated with a plurality of wavelengths;

an optical unit housed on an optical chip, the optical unit configured to perform wavelength division demultiplexing on the first temporally short and spectrally broad optical pulse;

a plurality of second I/O channels patterned as waveguides on the optical chip and coupled to the optical unit, each of the second I/O channels configured to output different ones of a plurality of second optical pulses, each of the second optical pulses associated with a unique wavelength range from the first temporally short and spectrally broad optical pulse;

a plurality of loop mirrors, each of the loop mirrors being disposed in a respective one of the patterned waveguides of the second I/O channels, each of the loop mirrors configured to receive the second optical pulses and to reflect the second optical pulses back to the optical unit;

wherein the optical unit is further configured to multiplex the reflected second optical pulses into the train of spectrally narrow and distinct optical pulses, wherein each pulse in the optical pulse train is associated with a unique wavelength range from wavelengths of the first temporally short and spectrally broad optical pulse, wherein the first I/O channel is further configured to output the optical pulse train; and an optical circulator is coupled to the first I/O channel, wherein the optical circulator is configured to receive the optical pulse train and to separate the optical pulse train outputted on the first I/O channel from an optical signal inputted on the first I/O channel.

9. The system of claim 8, wherein the loop mirrors are located at staggered distances from the optical unit.

10. The system of claim 9, wherein the loop mirrors further comprise:

a first loop mirror configured to receive a first of the second optical pulses at a first time; and a second loop mirror configured to receive a second of the second optical pulses at a second time later than the first time, wherein the second loop mirror is located farther from the optical unit than the first loop mirror.

11. The system of claim 10, wherein the optical unit is further configured to:

receive the first of the second optical pulses before receiving the second of the second optical pulses; and multiplex at least the first of the second optical pulses with the second of the second optical pulses into the optical pulse train, wherein an initial pulse of the optical pulse train has the same wavelength as the first of the second optical pulses and a subsequent pulse of the optical pulse train has the same wavelength as the second of the second optical pulses.

12. The system of claim 8, wherein the optical unit is an arrayed waveguide grating (AWG).

13. The system of claim 8, wherein the optical unit is a first optical unit, the system further comprising a second optical unit configured to:

modulate an initial pulse of the optical pulse train with an initial time portion of an analog waveform;

modulate a subsequent pulse of the optical pulse train with a subsequent time portion of the analog waveform; and demultiplex the modulated optical pulse train into a third plurality of optical pulses of different wavelengths, a first of the third optical pulses modulating the initial time portion of the analog waveform and a second of the third optical pulses modulating the subsequent time portion of the analog waveform.

14. The system of claim 8, wherein the first temporally short and spectrally broad optical pulse spans a shorter period of time than the optical pulse train.

* * * * *

UNITED STATES PATENT AND TRADEMARK OFFICE
CERTIFICATE OF CORRECTION

Page 1 of 1

PATENT NO. : 8,655,176 B2
APPLICATION NO. : 12/694791
DATED : February 18, 2014
INVENTOR(S) : Jackel It is certified that error appears in the above-identified patent and that said Letters Patent is hereby corrected as shown below:

In the Specification

Column 4, Line 21, delete "pulses" and insert -- pulses. --, therefor.

Column 5, Line 16, delete "pulse n 218" and insert -- pulse n 212 --, therefor.

Column 6, Line 4, delete "2 pulse" and insert -- pulse 2 --, therefor.

In the Claims

Column 7, Line 19, in Claim 3, delete "minor," and insert -- mirror, --, therefor.

Signed and Sealed this
Eleventh Day of November, 2014

Michelle K. Lee
*Deputy Director of the United States Patent and Trademark Office*